United States Patent [19]

Wyler

[11] Patent Number: 5,028,285

[45] Date of Patent: Jul. 2, 1991

[54] PROCESS FOR BONDING LEATHER TO LEATHER

[76] Inventor: Adolf Wyler, 25 Bayit Vegan St., Jerusalem 96 425, Israel

[21] Appl. No.: 543,201

[22] Filed: Jun. 22, 1990

Related U.S. Application Data

[63] Continuation of Ser. No. 91,824, Sep. 1, 1987, abandoned.

[30] Foreign Application Priority Data

Sep. 2, 1986 [IL] Israel ................................. 79921

[51] Int. Cl.$^5$ .............................................. B32B 31/20
[52] U.S. Cl. ............................................. 156/61; 69/21; 156/306.3; 156/308.2; 156/311; 156/312
[58] Field of Search ............... 156/306.3, 325, 326, 156/276, 283, 60, 61, 308.2, 311, 312; 428/473, 904; 69/21, 21.5; 8/94.1 R, 94.24

[56] References Cited

U.S. PATENT DOCUMENTS

| | | | |
|---|---|---|---|
| 40,593 | 11/1863 | Allen | 428/473 |
| 258,057 | 5/1882 | Gunther | 428/473 |
| 1,779,368 | 10/1930 | Cavanagh | 156/312 |
| 2,516,283 | 7/1950 | Winheim | 8/94.24 |
| 3,304,346 | 2/1967 | D'Alelio | 8/94.24 |
| 4,650,955 | 3/1987 | Zaborowski | 69/21.5 |

FOREIGN PATENT DOCUMENTS 5175108 12/1974 Japan ................................. 69/21

OTHER PUBLICATIONS

"Zur Herstellung von Lederfaserwerkstoffen"; Dr. H. Lohmann; pp. 1–5; Chemische Fabrik Stockhausen GmbH.

*Primary Examiner*—Jenna Davis
*Attorney, Agent, or Firm*—Steinberg & Raskin

[57] ABSTRACT

Bonding of leather to leather without the use of any adhesives is achieved by pressing together the two leather portions to be bonded at a pressure of at least about 50 bar and at a bonding temperature of from about 60° to about 200° C. for at least 10 seconds and subsequently cooling them or allowing them to cool while maintaining a pressure of at least about 10 bar at any time during said cooling when the temperature is above about 85° C., the entire process being conducted in an oxygen-poor environment.

13 Claims, No Drawings

PROCESS FOR BONDING LEATHER TO LEATHER

This is a continuation division of application Ser. No. 091,824, filed 9-1-87 now abandoned.

BACKGROUND OF THE INVENTION

The present invention concerns a novel process for bonding leather to leather without the use of any adhesives. The bonding of leather to leather is achieved in accordance with the present invention by the application of heat and high pressures and the process may thus be compared to welding.

The hitherto known methods of securing pieces of leather to each other include stitching, stapling, rivetting and the like and in particular glueing (e.g. with animal glue, contact cement, polyurethane adhesives, etc.). Each of these methods has its drawbacks as regards the strength and the durability of the connection or bond between the leather pieces, the aesthetic appearance of the product and, in some cases, the complexity of the operational procedure and its adaptability to large-scale manufacture and/or automation. Thus, for example, a glueing operation of leather, say in the shoe industry, involves quite a number of individual operational steps including the preliminary preparation of the leather surfaces for the glueing, application of the adhesive, pressing, drying and subsequent finishing.

It has surprisingly been found in accordance with the present invention that a very strong and permanent bond between two portions of leather can be effected by the application of heat and high pressure to the bonding zone for a comparatively short duration without the need of any auxiliary bonding materials or devices such as adhesives, yarn or metallic or nonmetallic staples, rivets or the like.

SUMMARY OF THE INVENTION

The invention thus provides a process for bonding two portions of leather to each other, which comprises pressing said portions together at a pressure of at least about 50 bar and at a bonding temperature of from about 60° to about 200° C. for at least 10 seconds and subsequently cooling them or allowing them to cool while maintaining a pressure of at least about 10 bar at any time during said cooling when the temperature is above about 85° C., the entire process being conducted in an oxygen-poor environment, as herein defined.

In the context of the present invention the term "leather" is meant to refer to both natural leather of all kinds of animal origin, in particular tanned leather, and any leather-like artificial materials which consist mainly of natural leather, for example the product "LEFA" or which is a product of leather fibers and 20–45% latex the thermoplastic material made from leather scrap which is described in co-pending Israel Patent Application No. 74480 which corresponds to U.S. patent application Ser. No. 081,656.

DESCRIPTION OF PREFERRED EMBODIMENTS

As stated above the bonding process according to the present invention should be conducted in an oxygen-poor environment. This term is defined herein as an environment containing substantially no oxygen or containing oxygen in an amount which is insufficient, at the given process conditions, to cause oxidative deterioration of the leather, as evidenced, e.g. by charring (carbonization), emission of gaseous decomposition products or embrittlement of the leather. Ideally, the process should be conducted substantially in total absence of oxygen, i.e. in vacuo or in an oxygen-free atmosphere, such as nitrogen or an inert gas. It has been found, however, in accordance with the present invention that it is not essential to entirely exclude oxygen and that good results are obtained even in the presence of limited amounts of oxygen in the surrounding atmosphere, such amounts depending on the nature of the leather submitted to the bonding process, to the temperature to which the leather is heated and to the duration of such heating.

In accordance with the above, the process according to the invention can be carried out successfully in a closed die provided with heating and cooling means, or in a punch press wherein the piston or stamp is provided with both heating and cooling means and with an arrangement, e.g. a cylindrical sleeve, whereby said piston and the leather portions to be bonded can be enclosed throughout the heating stage within a chamber, so as to prevent free circulation of air.

In accordance with the process of the present invention the two (or more) portions of leather which are to be bonded to each other are juxtaposed in the geometrical configuration which they are to assume after the bonding and are held together in this configuration by means of suitable mechanical means. Such means can be, for example, the two parts of the die or press which will be used in subsequent stages of the process for the application of the high pressure. Those areas of the contact zone of the two leather portions, whereat the bonding is to be effected, are then gradually heated to the final bonding temperature which, as stated above will be between about 60° to about 200° C. In accordance with a preferred embodiment of the invention the contact zone of the portions of leather to be bonded is subjected, already during the preliminary heating up stage, to an elevated pressure of at least about 10 bar, or even to the final pressure which is required for effecting the bond and which, as stated above, is at least about 50 bar. As the temperature of the bonding zone approaches the final bonding temperature, the pressure is increased, if necessary, to said final pressure of at least 50 bar and this pressure is maintained until the final bonding temperature is reached and throughout the actual bonding stage which may extend from 10 seconds to several minutes, depending on the type of leather and the process conditions as well as on the desired strength of the bond to be formed.

After the application of the predetermined bonding temperature and pressure for the required length of time, the bonded leather portions are cooled actively or allowed to cool to about 35° C. or a lower temperature, while maintaining the bonding zone under an elevated pressure, at least until the temperature has dropped to about 85° C. This elevated pressure is preferably equal to the aforesaid bonding pressure but may also be a lower pressure of at least 10 bar. In cases where the bonding is effected at a temperature of not more than 85° C., the cooling stage may be conducted without the application of pressure.

The heating of the bonding zone in the bonding stage, as well as the positive cooling in the subsequent final stage of the process, are preferably effected by heating and cooling means, respectively, provided in or around one or both parts of the die serving for the application of the high pressure. Alternatively, a die or a part thereof provided with heating means can be used in the preliminary heating up stage and the bonding stage of the process and thereafter replaced by another die or a part thereof provided with cooling means for use in the cooling stage of the process. It has been found in accordance with the invention that a comparatively short release of the high pressure, as may be involved in such a replacement, does not negatively affect the mechanical characteristics of the resulting bond.

In accordance with a preferred embodiment of the invention the leather-to-leather bond strength is increased by inserting between the two leather portions to be bonded to each other, at the bonding zone, a thin layer of finely ground leather particles, which layer should have a thickness of less than 1 mm. This preferred embodiment of the process of the invention was found to be especially advantageous in cases where the surface of one or both leather portions between which the bond is to be formed, is (or are) rough. However, even when smooth leather surfaces are bonded to each other, the incorporation of the finely ground leather particles in the bonding zone has been found to increase the mechanical strength of the resulting bond by about 30 to 50%. The finely ground leather for use in accordance with this embodiment may suitably be obtained by shredding or milling of scraps of hides or tanned leather or mixtures thereof.

The leather-to-leather bonds achieved by the process of the present invention were found to exhibit excellent lap shear strength in the range of 40 to 100 kg/cm$^2$. For comparison, the shear strength of leather-to-leather bonds formed by the use of conventional adhesives usually range up to 30 kg/cm$^2$.

The invention will now be illustrated in detail by the following non-limiting examples.

EXAMPLE 1

Two strips of mixed-tanned (vegetable and chrome tanned) bovine leather having a thickness of 4.5 mm were bonded together by the following procedure:
1) The surfaces of the strips were cleaned with a stream of pressurized air.
2) Overlapping parts of the strips were pressed together between two pistons of a die having smooth surfaces and being enclosed within a cylindrical sleeve, at an initial pressure of 400 bar and gradually heated up to 114° C.
3) When the aforesaid temperature was reached, the pressure was increased to 670 bar at a rate of 10 bar/second.
4) The temperature of 114° C. and the pressure of 670 bar were maintained for 15 seconds.
5) The entire assembly was cooled at a rate of 20° C. per minute under the same pressure of 670 bar.
6) When the temperature reached 35° C. the pressure was released and the bonded leather strips removed from the die.

The lap shear strength of the bond was found to be 42 kg/cm$^2$.

EXAMPLE 2

Two leather strips identical with those used in Example 1 were bonded together by the following procedure:
1) The surfaces of the leather strips were cleaned with a stream of pressurized air.
2) The strips were placed in a die similar to that used in Example 1 except that one of its pistons had a smooth surface whereas the other was formed in the shape of a rectangular stamp having a width of 10 mm. A pressure of 50 bar was applied and heating started.
3) When a temperature of 140° C. was reached after about 2 minutes the pressure was increased to 125 bar at a rate of 2.5 bar per second.
4) The temperature of 140° C. and pressure of 125 bar were maintained for 30 seconds.
5) The assembly was allowed to cool and the pressure reduced at a rate of 1.6 bar per second until atmospheric pressure was reached and the bonded leather strips removed from the die.

The lap shear strength of the bond was 75 kg/cm$^2$.

EXAMPLE 3

Two strips of lime-tanned sheep skin leather having a thickness of 0.8 mm were bonded together by a procedure similar to that described in Example 1.

The heating up as in step 2) of the procedure of Example 1 was carried out under a pressure of 250 bar until a temperature of 85° C. was reached and these pressure and temperature conditions were maintained for 15 seconds. The cooling in stage 5) of the procedure described in Example 1 was carried out under the same pressure of 250 bar at a cooling rate of 20°/minute.

The resulting bond was so strong that the two strips could not be separated manually.

EXAMPLE 4

Two strips of bovine leather identical with those used in Example 1 were bonded to each other in accordance with the following procedure:
1) The surfaces of the leather strips were cleaned with pressurized air.
2) A 0.5 mm thick layer of finely ground leather, consisting of 80% mixed tanned leather and 20% of lime-tanned sheep skin leather, was inserted between overlapping parts of the strips which were then submitted to an identical treatment as in stages 2) to 6) of Example 1 except that in stage 4) the temperature of 114° C. and the pressure of 670 bar was maintained for 20 seconds.

The lap shear strength of the bond was 70 kg/cm$^2$.

EXAMPLE 5

The procedure of Example 4 was repeated with identical strips of bovine leather and the same finely ground leather, at various combinations of initial pressure ($P_B$), final pressure ($P_F$), bonding temperature (T) and rate of increase of pressure from $P_B$ to $P_F$ ($\Delta P/\Delta t$). The results are summarized in the following Table I which also lists the lap shear strength of the leather-to-leather bonds obtained ($\tau$).

TABLE I

| Example No. | $P_B$ [bar] | $P_F$ [bar] | $\frac{\Delta P}{\Delta t} \left[ \frac{bar}{sec.} \right]$ | T [°C.] | $\tau \left[ \frac{kg}{cm^2} \right]$ |
|---|---|---|---|---|---|
| 5a | 400 | 670 | 11 | 108 | 98 |
| 5b | 410 | 680 | 17 | 122 | 86 |
| 5c | 410 | 680 | 17 | 114 | 78 |
| 5d | 660 | 1650 | 35 | 140 | 75 |
| 5e | 397 | 660 | 13 | 112 | 74 |
| 5f | 410 | 670 | 10 | 148 | 70 |
| 5g | 400 | 660 | 10 | 122 | 63 |
| 5h | 50 | 663 | 26 | 116 | 60 |
| 5i | 410 | 680 | 13 | 118 | 52 |
| 5j | 670 | 670 | 0 | 102 | 52 |
| 5k | 185 | 675 | 23 | 116 | 42 |
| 5l | 400 | 670 | 7 | 116 | 42 |
| 5m | 650 | 700 | 8 | 104 | 40 |

TABLE I-continued

| Example No. | $P_B$ [bar] | $P_F$ [bar] | $\frac{\Delta P}{\Delta t} \left[\frac{bar}{sec.}\right]$ | T [°C.] | $\tau \left[\frac{kg}{cm^2}\right]$ |
|---|---|---|---|---|---|
| 5n | 610 | 680 | 6 | 134 | 39 |
| 5o | 90 | 660 | 25 | 114 | 40 |
| 5p | 400 | 675 | 35 | 86 | 30 |
| 5q | 185 | 570 | 20 | 75 | 35 |
| 5r | 244 | 870 | 30 | 71 | 23 |
| 5s | 250 | 870 | 31 | 68 | 18 |

EXAMPLE 6

Two strips of pigskin leather (tanned for commercial use) having a thickness of 1 mm were bonded together by a procedure similar to that described in Example 4.

A 0.8 mm thick layer of finely ground particulate lime-tanned sheepskin leather was inserted between overlapping parts of the strips. The strips were then submitted to an initial pressure of 60 bar, gradually heated to 108° C. while the initial pressure was increased to 400 bar at a rate of 20 bar/second.

The pressure of 400 bar and the temperature of 108° C. were maintained for 20 seconds and thereafter the entire assembly was cooled at a rate of 20°C./minute under the same pressure of 400 bar.

The resulting bond was so strong that the two strips could not be separated manually.

EXAMPLE 7

Two strips of chrome-tanned bovine leather having a thickness of 1.5 mm were bonded together by the procedure of Example 6, with an initial pressure of 60 bar increasing to a final pressure of 480 bar at a rate of 24 bar/second and a bonding temperature of 125° C. Cooling was done under a pressure of 480 bar.

The resulting bond was so strong that the two strips could not be separated manually.

I claim:

1. A process for bonding two portions consisting essentially of natural leather to each other, which comprises
   pressing said portions together at a constant zone at which the bonding is to be effected, at a pressure of at least about 50 bar and at a bonding temperature of from 60° to about 200° C. for at least 10 seconds, and
   subsequently cooling the thus pressed portions while maintaining a pressure of at least about 10 bar during said cooling when the temperature is above about 85° C.;
   the entire process being conducted in an oxygen-poor environment and without use of any auxiliary bonding agent.

2. A process according to claim 1 wherein, in a preliminary process stage the contact zone of said leather portions at which the bonding temperature is to be effected is gradually heated up to said bonding temperature under a pressure of at least 10 bar and when the temperature of said contact zone reaches said bonding temperature, said bonding pressure is increased to at least about 50 bar.

3. A process according to claim 1, wherein said cooling is carried out under a pressure of at least 10 bar until a temperature of about 35° C. is reached.

4. A process according to claim 3, wherein the pressure during cooling is equal to the pressure at which the leather portions are bonded to each other.

5. A process according to claim 2, wherein said bonding temperature is higher than 85° C.

6. A process according to claim 1, wherein prior to said pressing together of said two leather portions, a layer of finely ground particulate leather is interposed between them, at their mutual contact zone, said layer having a thickness of at most 1 mm.

7. The process of claim 1, wherein said natural leather forms part of a product comprising natural leather fibres and 20-45% latex which is not a bonding agent.

8. The process of claim 1, wherein one of said two portions forms part of a product comprising natural leather fibres and 20-45% of latex which is not a bonding agent.

9. The process of claim 6, comprising the additional step of
   increasing mechanical strength of the resulting bond by about 30-50%, by the interposing of said layer of finely ground particulate leather.

10. The process of claim 1, comprising the additional step of
    first tanning the natural leather with an agent selected from the group consisting of vegetable, chrome, lime, and mixtures thereof.

11. The process of claim 10, wherein said tanning agent is a mixture of vegetable and chrome.

12. The process of claim 10, wherein said tanning agent is lime.

13. The process of claim 10, wherein said tanning agent is chrome.

* * * * *